July 2, 1946.   D. T. DOWNES   2,403,061
WINDOW CONSTRUCTION
Filed June 16, 1943
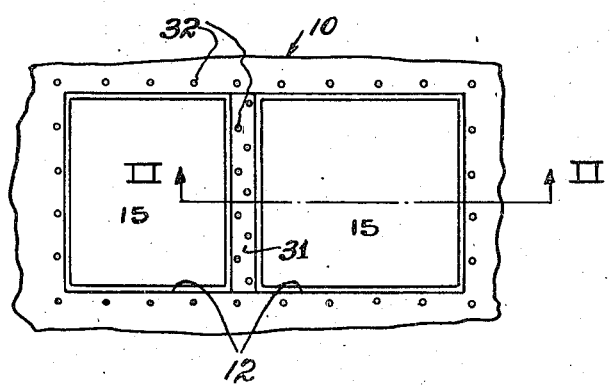
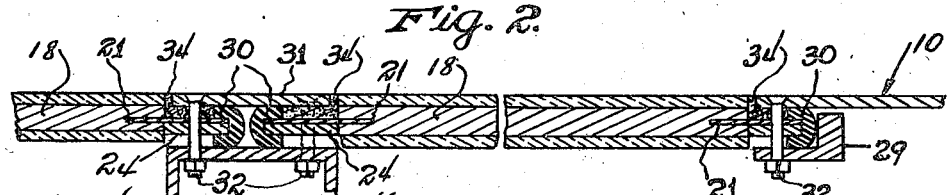
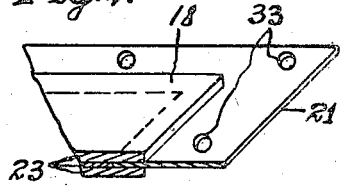
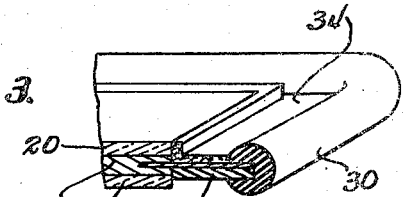
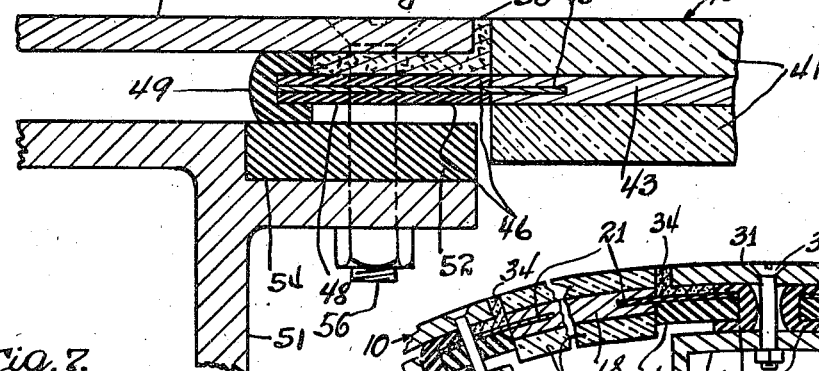
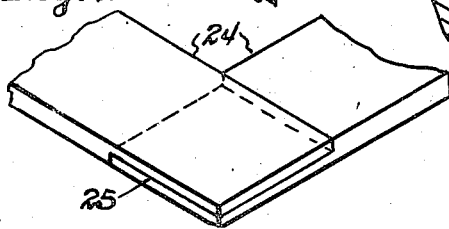
Inventor
DANIEL T. DOWNES
By Olen E. Bee
Attorney Patented July 2, 1946

2,403,061

UNITED STATES PATENT OFFICE 2,403,061

WINDOW CONSTRUCTION

Daniel T. Downes, Creighton, Pa., assignor to Pittsburgh Plate Glass Company, Allegheny County, Pa., a corporation of Pennsylvania Application June 16, 1943, Serial No. 490,990

2 Claims. (Cl. 189—64)

This invention relates to glass closure structures and it has particular relation to such structures in which laminated glass units are flexibly mounted in wall sections without clamping the glass portions of such structure.

One object of the invention is to provide an improved closure structure in which laminated glass is connected to surrounding frame elements by means of flexible border flanges adapted to receive clamping elements without imparting clamping forces upon the glass portions of the structure.

Another object of the invention is to provide an improved laminated glazing unit particularly adapted to withstand air pressures in pressurized airplane compartments in which relative inside and outside air pressures vary according to the altitude at which the airplane flies.

Another object of the invention is to provide an improved fluid-tight joint between flexible flanges extending from laminated glass and surrounding supporting frames.

In a practical application of the invention, plastic interlayer material is provided with glass plates bonded upon opposite sides thereof to form a laminated unit. Before the bonding operation is effected sheet metal in strip form is mounted entirely around the perimeter of the unit with its inner edges extending into, and anchored to, the plastic interlayer between the marginal portions of the glass. The outer edges of the sheet metal extend outwardly to form a surrounding flange sufficiently flexible and resilient to support the glass in a frame structure which is distortable, or more or less flexible. Packing material, such as mastic, rubber compound, or the like, is applied to at least one side of the projecting sheet metal. Resilient channel members of plastic material embrace the marginal portions of the combined sheet metal and plastic extending from the glass edges, and clamping members are drawn against these channel members which insures proper sealing at a sufficient distance from the glass edges to permit the flange to compensate for bending, twisting or other deformation to which the supporting frame may be subjected.

In the drawing:

Fig. 1 is a fragmentary side elevation of a wall section including a laminated closure structure; Fig. 2 is a fragmentary cross-section, on a larger scale, taken substantially along the line II—II of Fig. 1; Fig. 3 is a fragmentary perspective, partially in section, of a glazing unit; Fig. 4 is a fragmentary perspective, partially in section, illustrating the application of strip metal to plastic interlayer material; Fig. 5 is a cross-section similar to Fig. 2 of a curved wall section in which the invention has been incorporated; Fig. 6 is a cross-section similar to Fig. 2 of another arrangement of mounting elements; and Fig. 7 is a fragmentary perspective of corner arrangement of flexible deformable strips employed in mounting a glazing unit.

In practicing the invention a wall section 10, which can be in the form of a part of an airplane compartment, vehicle, or other structure, is provided with openings 12 in which closure units 15 of transparent laminated form are disposed. A frame member or pier 16 separates the openings 12 and forms a part of the wall section.

Each closure unit 15 comprises a sheet interlayer 18 of organic plastic, such as vinyl acetal resin, or other resin that is adapted to be employed in laminating glass. Plates of glass 20 are bonded upon opposite sides of the interlayer under conditions of heat and pressure employed in conventional practice of laminating glass. In assembling the laminations preparatory to the bonding operation resilient sheet metal 21 in strip form is disposed between the marginal portions of the glass plates, and in the final laminating steps it is bonded to the sheet interlayer 18 in such manner that the metal does not touch the glass. As shown in Fig. 4, the interlayer sheet 18 can be in the form of two or more plastic layers 23 between the marginal portions of which the sheet metal 21 is positioned. The strip metal is disposed entirely around the perimeter of each laminated unit and constitutes a resilient mounting flange which is sufficiently flexible in itself and in its plastic mounting to be capable of considerable movement relative to the glass.

Rubber or other plastic material 24 in strip form is bonded to at least one side of the extended sheet metal flanges 21 of each unit, and its inner edge abuts, and is bonded to, the edges of the interlayer sheet. The ends of the plastic strips 24 are rabbeted, as indicated at 25, and bonded or fused in overlapping relation at the corner portions of the unit in order to insure uniform thickness of the extended flange and plastic.

Resilient channel members 30, which are composed of resin, rubber, or the like, embrace the edges of the combined flange 21 and rubber 24 entirely around the perimeter of each unit. These channel members can be in the form of tubes of rubber compound split longitudinally to the hollow portion thereof.

Each unit 15 is set in its opening 12 with the flanges 21 supported upon the pier 16 and upon the marginal portions of the wall section 10 surrounding the openings 12. A clamping strip 31, which overlies the pier 16 between the units 15, forms a continuation of the wall section 10 and suitable fastening elements 32 extend therethrough and through the central pier 16, as well as through the flange 21. Additional clamping strips 29 on the inside of the wall section embrace the flanges 21 of the units 15 around the openings 12 at locations other than that traversed by the pier 16 and strip 31. The fastening elements 32 which are distributed entirely around each unit connect the flange to both the pier and the marginal portions of the wall section. Openings 33 in the flanges 21 are slightly larger in diameter than the shanks of the fasteners 32 so that the latter have such play therein as not to interfere with free flexing of the flanges between the channels 30 and the edges of the glass. Before the clamping plate 31 is clamped into position, suitable yieldable packing 34, such as mastic, rubber compound, or the like, is applied in layer or strip form, or by spreading, upon the flange 21. This packing is of such thickness as to be compressed to an appreciable degree before the clamping plates 31 and 29 are fully tightened against the channel members 30.

The packing 34 does not offer appreciable resistance to compression forces, but is applied primarily as a filler and yields to outward bulging of the sheet metal 21 under influence of internal pressures when the wall section constitutes a part of a pressurized compartment. Since the clamping plate 31 is disposed on the outside wall section pressure from the inner side of the section forces the flange 21 toward the inner surface of the plate, as well as toward the inner marginal portions of the wall section, and the yieldable character of the mastic packing 34 permits the edges of the flange 21 to have at least appreciable pivotal movement in the channel members 30 incidentally to the bulging of the units outwardly under pressure.

This type of arrangement is particularly useful and adaptable in connection with the mounting and functioning of laminated units which are curved or which constitute parts of continuous stream-lined wall sections, such as those shown in Fig. 5. All of the elements shown in this latter figure are also shown and described in connection with Figs. 1 and 2, and hence, the same reference characters are employed to designate corresponding parts. The only other appreciable difference lies in the fact that the fastening elements 32 are disposed between the channel members 30 in Fig. 5 instead of extending through the flanges 21. This arrangement provides more leeway for flexibility of the flanges from the glass plate edges to the channel members 30.

Fig. 6 illustrates a structure in which a laminated unit 40 comprises glass plates 41 bonded upon opposite sides of a sheet interlayer 43, which is constructed in the same manner as the interlayer 18 and, in like manner, is provided with a sheet metal flange 45 extending between the marginal portions of the glass, but free from contact with the latter. Rubber strips 46 are bonded upon opposite sides of the flange 45 and together therewith constitute a flange 48 disposed entirely around the perimeter of the unit. A plastic channel member 49, corresponding to the channel members 30, embraces the edges of the flange 48. Yieldable packing 50, corresponding to the packing 34, is applied to the flange 48 and a clamping member 51 having a rubber strip 52 mounted in a rabbeted portion 54 thereof receives the channel member thereon. Fastening elements 56 extending through the clamping member 51 and through the marginal portion of a wall section 57, as well as through the flange 48, confines the channel member in clamped and sealed relation. This unit operates in substantially the same manner as the units 15.

Although illustrative forms of the invention have been shown and described in detail, it will be apparent to those skilled in the art that the invention is not so limited, but that various changes can be made therein without departing from the spirit of the invention or from the scope of the appended claims.

I claim:

1. In a closure structure, an interlayer of organic plastic, glass plates bonded upon opposite sides of said interlayer to form a laminated unit, resilient sheet metal in strip form having one marginal portion disposed in the interlayer between the marginal portions of the glass plates and extending therefrom in the form of a mounting flange, a channel member of rubber compound surrounding the perimeter of the laminated unit and having the outer edge of the sheet metal flange disposed in the channeled portion of said member, supporting clamping structure embracing the channel member in clamped fluid-tight relation and leaving a flexible flange area between the edges of the glass and the area of clamping on said member, said channel member maintaining the clamping structure in spaced overlapping relation to the mounting flange, the edge of the outer overlapping portion of the clamping structure terminating short of the edges of the glass, and a layer of yieldable mastic filling the space between the overlapping clamping structure and the outer side of the mounting flange.

2. In a closure structure, an interlayer of organic plastic, glass plates bonded upon opposite sides of said interlayer to form a laminated unit, resilient sheet metal in strip form having one marginal portion disposed in the interlayer between the marginal portions of the glass plates and extending therefrom in the form of a mounting flange, a plastic channel member surrounding the perimeter of the laminated unit and having the outer edge of the sheet metal flange disposed in the channeled portion of said member, supporting clamping structure embracing the channeled member and leaving a flexible flange area between the edges of the glass and the supporting clamping structure, said sheet metal having openings extending through the flexible flange area thereof in materially spaced relation to both the channel member and glass edges, and fasteners extending through said clamping structure and loosely through said openings to clamp said clamping structure in fluid-tight relation upon opposite sides of the channel member while permitting flexing action of the flexible flange area.

DANIEL T. DOWNES.